Figure 1:
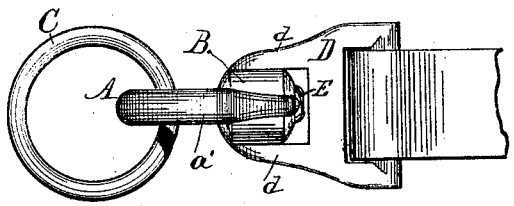

(No Model.) 2 Sheets—Sheet 1.

J. M. RANSIER.
LOCKING HOOK.

No. 304,855. Patented Sept. 9, 1884.

Witnesses:
Chas. L. Carman.
Taylor E. Brown

Inventor:
Julien M. Ransier
By
Munday, Evarts & Adcock
His Attorneys (No Model.) 2 Sheets—Sheet 2.

J. M. RANSIER.
LOCKING HOOK.

No. 304,855. Patented Sept. 9, 1884.

Witnesses:
Chas. L. Carman
Taylor E. Brown

Inventor:
Julien M. Ransier
By Munday, Evarts & Adcock
His Attorneys.

UNITED STATES PATENT OFFICE.

JULIEN M. RANSIER, OF OTTUMWA, IOWA.

LOCKING-HOOK.

SPECIFICATION forming part of Letters Patent No. 304,855, dated September 9, 1884.

Application filed March 3, 1884. (No model.)

*To all whom it may concern:*

Be it known that I, JULIEN M. RANSIER, a citizen of the United States, residing in Ottumwa, in the county of Wapello and State of Iowa, have invented a new and useful Improvement in Locking-Hooks, of which the following is a specification.

The object of this invention is to provide a self-locking hook for use upon halter-straps, ropes, chains, on back-bands of harness, as a post or check-hook on breast-straps, singletrees, stay-chains for wagons, pulleys, horse hay-forks, and in various other places about agricultural implements or harness; and to this end my invention consists in a hook provided with a movable slide on one side or branch of the hook, so constructed that when the slide is moved down to the mouth of the hook it will prevent the ring, loop, strap, or other article to be secured in the hook from passing out. This slide may preferably be mounted on the main stem or branch of the hook, and the free end or opposite side of the hook may be provided with a notch or depression for the ring or other article to be locked on the hook to permit the slide to be slipped past the same in disengaging it from the hook. The general curvature or form of the hook may, however, in many instances be such that no notch or depression is necessary to permit a ring or other article to be moved past the slide and disengaged from the hook. The slide may, if preferred, of course, be mounted on the free end or branch of the hook. The slide may be of any suitable construction adapted to close the mouth of the hook—as, for example, a hollow ring or ball fitting around one stem or branch of the hook, or, if desired, the stem of the hook may be made hollow or with a groove, and the slide be mounted therein. The means of attachment may be either to the hook itself or to the slide. If the hook itself is to be secured to a back-band or other device, the main stem may be provided with screw-threads for purpose of such attachment; or, if the slide is to be attached to a chain, strap, or other device, it may be provided with ears and an eye for a link of the chain, or for the strap, staple, or other device. The stem of the hook on which the slide is mounted may be round, square, rectangular, or of other form. By making the stem of the hook round it may swivel on the slide, which is desirable in some cases.

Another feature of my invention consists in pivoting the slide to a strap or eye-piece, against which the end of the hook may abut, so that the slide must be turned into a particular position to permit it to move on the hook, so that the ring may be disengaged. This particular construction of my invention affords extra security. It is adapted for use where great security against disengagement is essential or desired.

Figure 2:
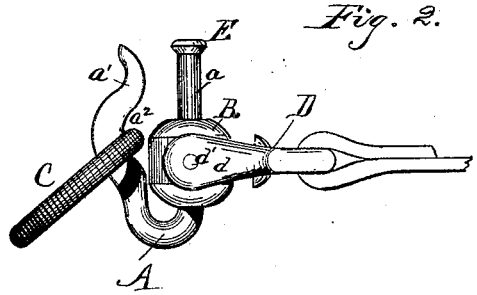
Figure 3:
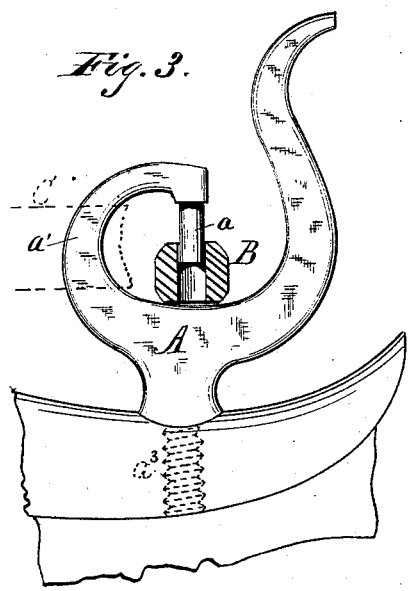
Figure 4:
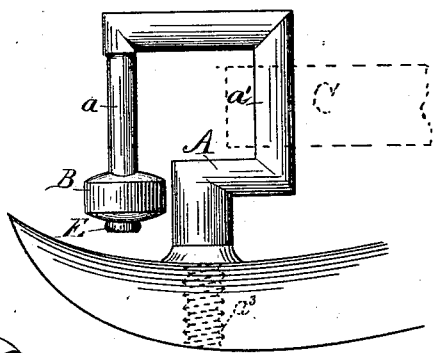
Figure 5:
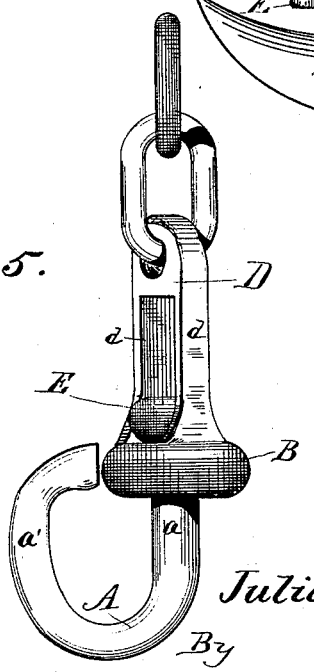
Figure 6:
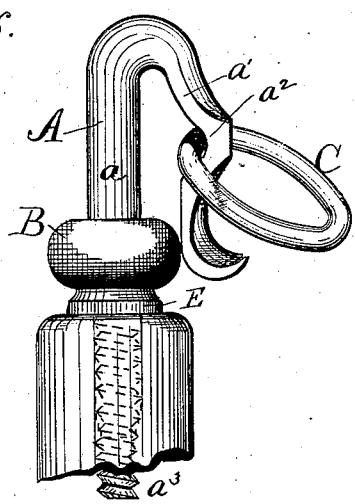
Figure 7:
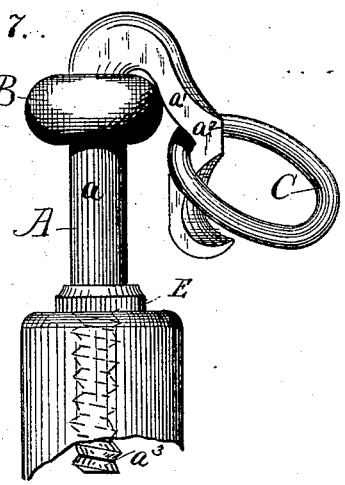
Figure 8:
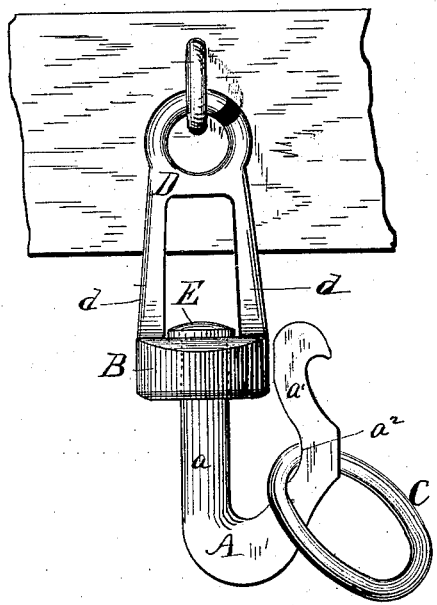
Figure 9:
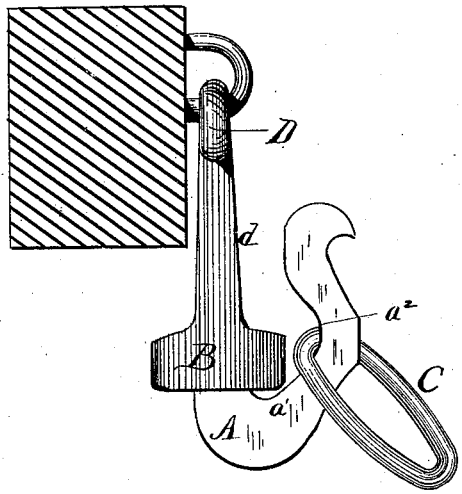

In the accompanying drawings, which form a part of this specification, and in which similar letters of reference indicate like parts, Figure 1 is a plan view of a device embodying my invention. Fig. 2 is a side elevation of the same, showing the slide turned and slipped into position for disengagement of the ring or other article secured in the hook. Fig. 3 is a side elevation showing my invention as applied to the post or check-hook of a back-band. Fig. 4 is a similar view of the same, showing a different-shaped hook. Fig. 5 shows a form of hook suitable to be applied to a chain. Figs. 6 and 7 show the hook attached to a hitching-post; and Figs. 8 and 9 show a hook somewhat similar to that represented in Fig. 5 attached to a manger. The hook shown in Figs. 6 and 7 may also be used as a post-hook for a back-band.

In the drawings, A represents the hook, and B the slide for closing its mouth.

C is a ring, loop, strap, or other article to be locked in the hook.

The stem $a$ of the hook upon which the slide B is mounted, should, preferably, be made straight, so that the slide will move freely and easily thereon. The opposite side or stem, $a'$, of the hook may be provided with a notch, bend, or depression, $a^2$, for the ring, which is made deep enough so that when the ring is placed therein, it will permit the slide B to be slipped past the ring, and the ring thus disengaged from the hook. The slide B may be pivoted to a strap or eye-piece or other attachment, D, provided with ears $d$, through which the pivot-pins $d'$ are inserted, so that this piece

D will prevent the stem of the hook moving on the slide, except when the slide is turned in particular directions. The hook may be provided with a screw, $a^3$, for securing it to the back-band or other device.

Instead of pivoting the slide to the strap or eye-piece D, as shown in Figs. 1 and 2, the slide may be cast or made integral with this eye-piece D, in which case the ears $d$ are made long enough to permit the hook to move on the slide sufficiently for the disengagement of the ring or other device locked in the hook. This construction of the invention is illustrated in Figs. 5, 8, and 9, and is suitable for halter chains or straps, stay-chains, and for other like purposes.

The principle and mode of operation of my hook-lock is the same whether the means of attachment be to the hook itself, as in Figs. 3, 4, 6, and 7, or to the slide, as represented in the other figures.

E represents a washer, cap, or head, fitting on the stem of the hook. It may serve to limit the motion of the slide. In Figs. 1, 2, 5, 8, and 9 this cap or head is riveted to or integral with the hook, and serves to secure the slide to the hook.

My lock-hook is adapted for use wherever it is desired to lock a ring, strap, or other article on a hook, and various other forms or modifications of the hook, the slide, and the means of attaching the one or the other may be employed, and will naturally suggest themselves in applying the invention to different purposes.

It will be observed that either the slide or the hook is supported or suspended so that the slide will operate by its own gravity, or by that of the hook to close the mouth of the hook at all times, so that my hook is self-locking.

I claim—

1. A hook provided with a loose-fitting vertically-movable slide on one branch of the hook to close the mouth of the hook by its own gravity, substantially as specified.

2. A hook provided with a slide mounted on one side or branch thereof, and having a bend or depression in its opposite side or branch for the ring or other article to be locked upon the hook, so that said slide may be slipped past the same, substantially as specified.

3. The combination of hook A, with slide B mounted on one stem of said hook, and attachment piece D, pivoted to said slide to prevent said slide moving on the hook, except when turned at an angle to said attachment piece D, substantially as specified.

4. The combination of hook A, slide B, and eye-piece D, pivoted to said slide, said hook A having a notch or depression, $a^2$, in its side opposite said slide, to permit the slide to be slipped past the ring or other article locked on the hook, substantially as specified.

5. The combination of hook A with slide B and ring C, said hook having a notch or depression, $a^2$, in its side opposite said slide, to permit the slide to be slipped past the ring, substantially as specified.

6. The combination, with a hook, of a slide mounted on one of the stems or sides of said hook, the opposite side of said hook having a depression to permit the slide to slip past the ring or article locked in the hook, and means of attaching and supporting one of said parts, either the hook or the slide, so that the other will by its own gravity keep the mouth of the hook closed by the slide, substantially as specified.

JULIEN M. RANSIER.

Witnesses:
W. L. ORR,
J. C. SLAUGHTER.